Feb. 25, 1947.   P. A. JEANNE   2,416,320
CATHODE RAY TUBE CIRCUIT
Filed Feb. 24, 1944   4 Sheets-Sheet 1
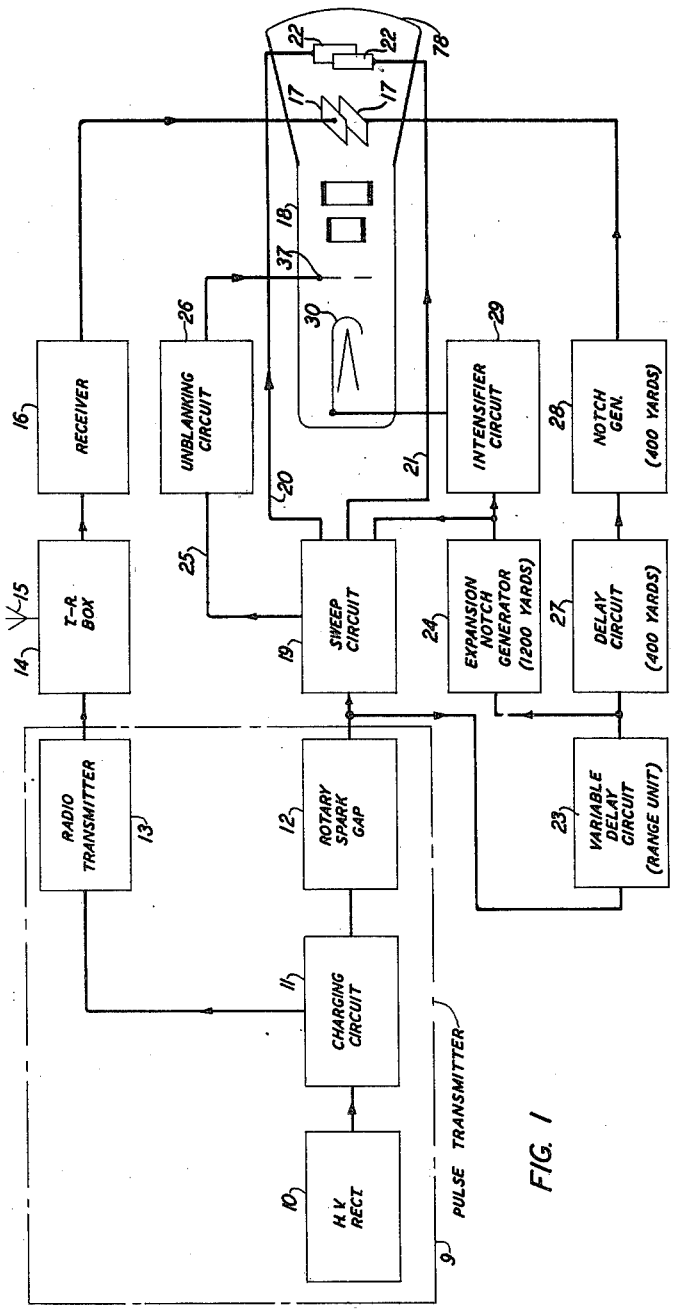
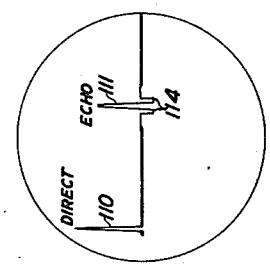
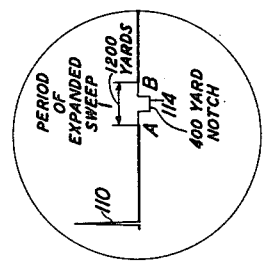
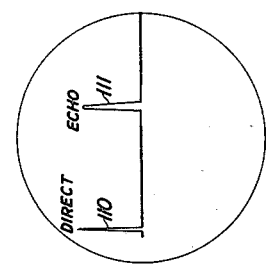
INVENTOR
P. A. JEANNE
BY Hugh S. Wertz
ATTORNEY

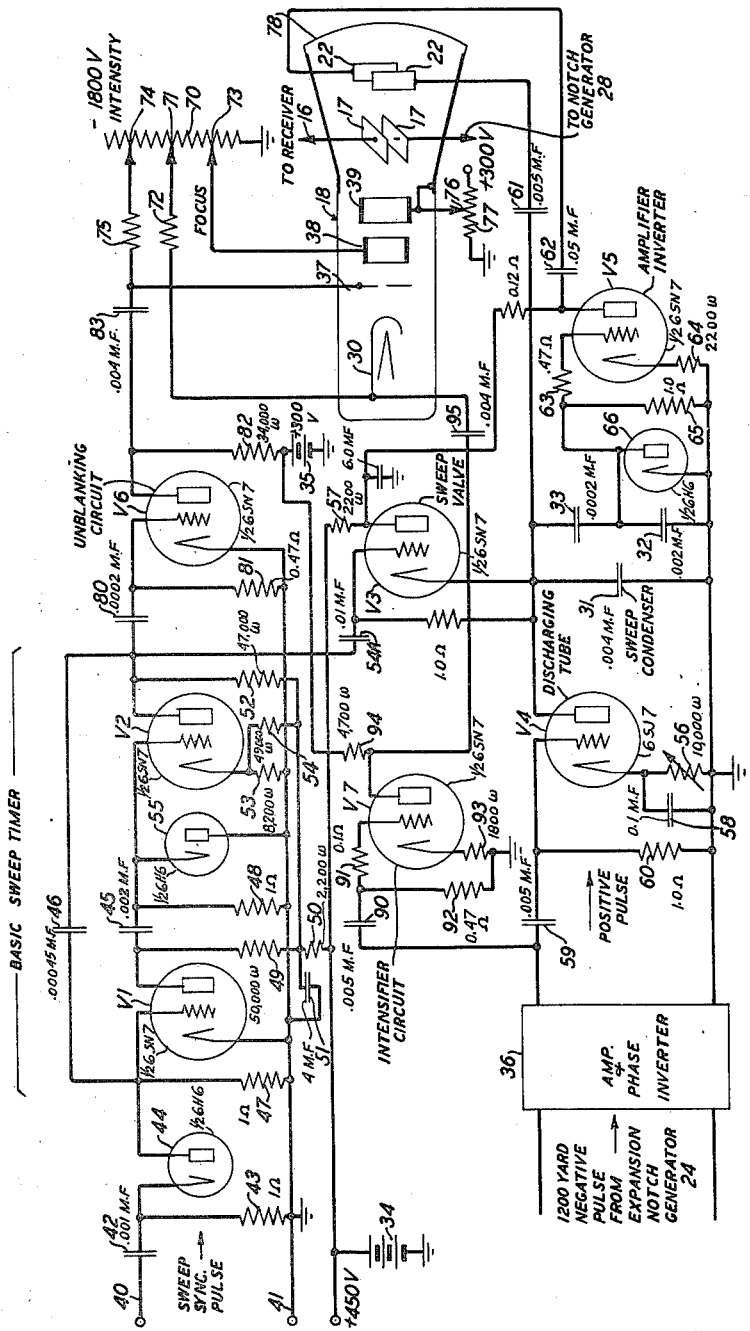

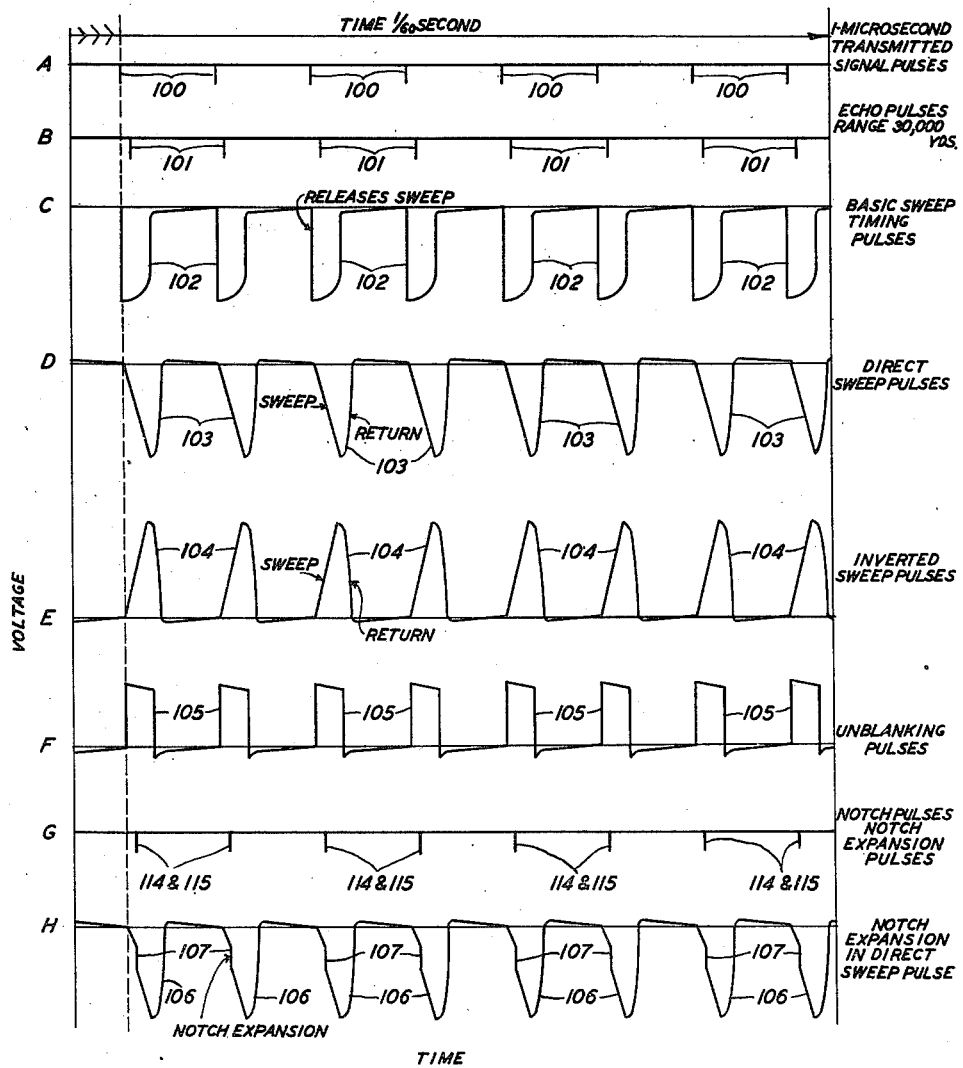

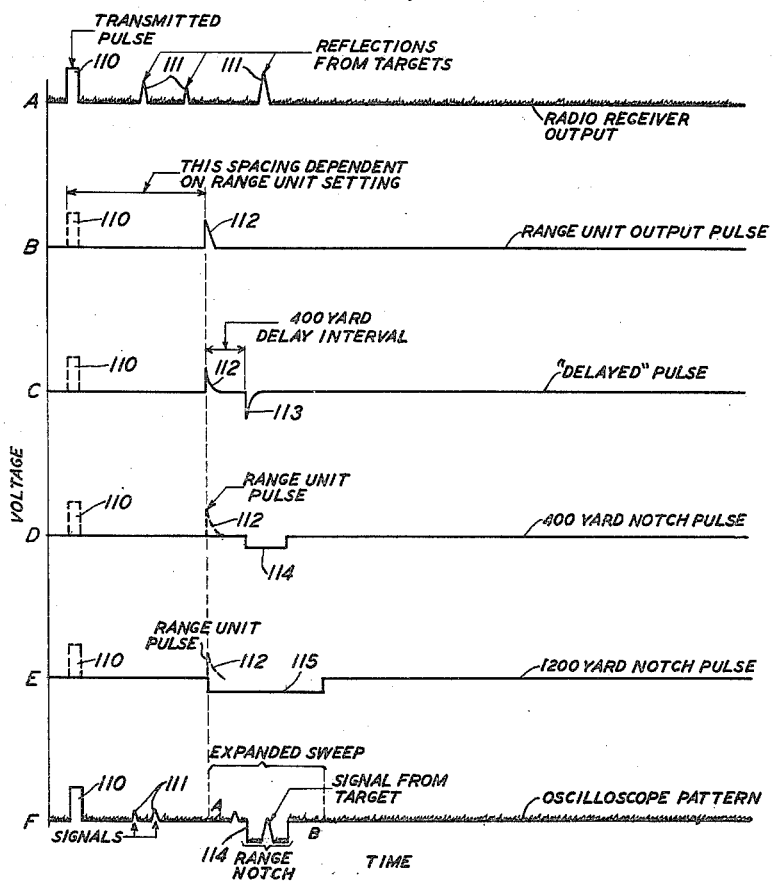

Patented Feb. 25, 1947

2,416,320

UNITED STATES PATENT OFFICE 2,416,320

CATHODE-RAY TUBE CIRCUIT

Paul A. Jeanne, Mount Vernon, N. Y., assignor to Bell Telephone Laboratories, Incorporated, New York, N. Y., a corporation of New York Application February 24, 1944, Serial No. 523,691

6 Claims. (Cl. 315—29)

This invention relates to an indicating system and particularly to a sweep circuit for an indicating system of the type employing a cathode ray tube.

The use of a cathode ray tube as an indicating or viewing device is well known in the art. In a typical arrangement, the cathode ray beam generated in the tube is deflected by means of a varying voltage, called the sweep voltage, applied to one set of deflection elements so that it sweeps at a known rate over a predetermined path on a screen or target to provide a linear time scale or axis and the signals, a visual indication of which is desired on the screen of said tube, are applied to a second set of deflection elements in such manner as to cause transverse deflections of the beam from its normal path. The disposition of the latter deflections along a normal path as displayed on the screen indicates the time intervals existing between the signals and the width of each signal image indicates its time duration. In order that individual signals or restricted portions of the time scale of the cathode ray indicator tube may be closely observed, it is necessary in general to expand the scale beyond the available range of the screen. As a result of such sweep expansion, much of the total sweep range would be lost from view. To prevent this undesirable result, it has been heretofore proposed to expand a portion only of the timing scale of an indicating circuit employing a cathode ray indicator tube.

It is an object of this invention to provide improved means for causing the expansion of a portion only of the timing scale of an indicating circuit employing a cathode ray indicator tube.

In accordance with a specific embodiment of the invention chosen by way of example for purposes of illustration, a sweep circuit is provided which comprises a sweep capacitor which is maintained in the charged condition by a sweep valve which is normally conducting, and a pulse generator called a basic sweep timer which produces square pulses of, for example, 600 microseconds duration once every 480th of a second which cuts off the sweep valve to allow the sweep capacitor to discharge through a tube whose anode-cathode path is connected across the sweep capacitor. This latter tube in the normal sweep circuit would probably be called a "constant current" tube but in the present circuit the current flow therethrough is maintained substantially constant at one value during those portions of the sweep cycle during which the time scale is not expanded but which has a pulse applied to its grid-cathode circuit to increase the rate of discharge of the condenser through this tube for the length of time it is desired to expand the time scale. During the period of expansion the current flow is preferably maintained substantially constant at a higher value. The start of this pulse can be controlled so that any desired portion of the timing scale can be expanded. This control is analogous to that obtained by moving a lens (magnifying in the direction of movement) along the scale of a slide rule. Moreover, the duration of the pulse can be varied to control the duration of the time scale expansion.

In the illustrative embodiment of the invention the sweep circuit of this invention is employed in connection with a cathode ray indicating device used in a radar system, the indicating device being utilized to give a visual presentation of one or more echo pulses and, if desired, of direct pulses from the radar transmitter. A negative pulse (called the "expansion notch"), the initiation of which is controlled by a synchronizing pulse from the radar pulse transmitter operating through a variable delay circuit or unit (called the "range unit"), is utilized to produce a positive pulse which controls the discharge tube in the sweep circuit so as to expand the timing scale of the oscilloscope for the duration of the expansion notch which time interval, for example, may correspond to 1200 yards range. This expansion notch or pulse is also applied to an amplifying circuit to produce an amplified negative pulse of the same duration which is applied to the cathode of the cathode ray tube to swing the potential of the cathode ray tube negatively with respect to the control element therein and thereby increase the intensity of the beam for the period covered by the expansion notch or, in other words, for the period of time that the time scale is expanded.

The invention will be more readily understood by referring to the following description taken in connection with the accompanying drawings forming a part thereof in which:

Fig. 1 is a schematic block diagram of an indicating system employing a sweep circuit in accordance with the invention;

Fig. 2 is a circuit diagram of a portion of the system shown in Fig. 1; and

Figs. 3 to 7, inclusive, are diagrammatical representations to aid in understanding the invention.

Referring more specifically to the drawings, Fig. 1 shows, by way of example for illustrative purposes, a radar system employing an indicating arrangement using a sweep circuit in accordance with the invention. Fig. 1 is a single line block diagram to show the relationship of the various major elements of the system and is not intended to be a circuit diagram. In the arrangement of Fig. 1, a high voltage rectifier 10 in the radar pulse transmitter 9 supplies about 12,000 volts direct current to a suitable charging circuit or element 11 capable of producing a still higher voltage. After the charging voltage builds up to about 21,000 volts, a rotary spark gap 12 discharges the capacitor in the charging circuit. This discharge takes place in about 1 microsecond and causes a magnetron ocsillator 15 in the radio transmitter 13 to oscillate for this brief period and send short pulses of radio frequency energy through a T-R box 14 to an antenna 15 which, for example, includes a wave guide and a parabolic reflector. Any suitable antenna may be used. Radio frequency pulses from the antenna (called "transmitted pulses" or "emitted pulses") strike one or more objects and produce reflections or echoes therefrom which are received by the antenna 15 and transmitted through the T-R box 14 to the receiver 16. The T-R box may be of any desirable type, for example, that employing a Western Electric Company 709A tube in a resonant cavity. This tube is filled with an ionizable gas and has a small gap therein. During reception of the low voltages of the received energy, the gas is not ionized, the cavity is tuned to resonance and the received energy is applied to the receiver 16. During the transmission of a pulse from the radio transmitter 13, the voltage due to the pulse ionizes the gas, thus detuning the cavity and substantially preventing the energy of the pulse from reaching the receiver 16.

In the receiver 16 the received waves are heterodyned to a convenient intermediate frequency and these intermediate frequency waves are amplified, detected, amplified and applied to one of the vertical deflecting plates 17 of a cathode ray oscilloscope 18. The received waves cause, for example, a sharp upward deflection of the trace of the cathode ray beam generated in the tube 18. A typical trace is shown in Fig. 7—A, the pulse 110 representing the transmitted pulse and the pulses 111 being caused by reflections from targets.

Energy from the rotary spark gap 12 (which is in the nature of a synchronizing pulse) controls the sweep circuit 19 which, by means of the connections 20 and 21 to the deflecting plates 22, causes the cathode ray beam to sweep across the screen once per pulse. Energy from the rotary spark gap is also fed into a variable delay circuit or unit 23 (the range unit) which produces a sharp pulse 112 a controllable period of time after the initiation of each pulse in the rotary spark gap. A suitable range unit is disclosed in an application of L. A. Meacham, Serial No. 491,791, filed June 22, 1943 or in an article entitled "The SCR–584 radar" in the February 1946 issue of "Electronics" beginning on page 110. The output pulse from the circuit 23 which is shown in Fig. 7—B is fed to an "expansion notch" generator 24 which produces a negative pulse 115 which has a duration corresponding, for example, to a range of 1200 yards. This pulse is shown in Fig. 7—G. Any suitable circuit for producing such a pulse can be used. Merely by way of example, a suitable circuit is disclosed in an application of B. M. Oliver, Serial No. 486,780, filed May 13, 1943. This pulse is applied to the sweep circuit 19 to make a controllable portion of the sweep voltage wave produced by this sweep circuit of a greater voltage gradient than the rest of the wave and thus to expand in the direction of the sweep the pattern on the oscilloscope screen for a distance corresponding to the length of this pulse. A portion of the energy from the sweep circuit 19 is also applied by means of a connection 25 to an unblanking circuit 26 to release the beam, which has been previously blanked off, for a period of about 600 microseconds after the initiation of each pulse from the rotary spark gap 12.

The pulse from the variable delay circuit 23 is also connected through a delay circuit 27 which "delays" the pulse for a period corresponding to about 400 yards range by producing a pulse 113 which is delayed from the pulse 112 by a period corresponding to a range of 400 yards. A suitable delay circuit is disclosed in the above-identified Oliver application or in Patent 2,226,706, issued December 31, 1940, to M. Cawein. The delay interval is shown in Fig. 7—C. The "delayed" pulse is applied to a pulse generator 28 (called the "400-yard notch generator") which is, for example, similar to the expansion notch generator 24 except for some differences in circuit constants. This circuit generates, as shown in Fig. 7—D, a pulse 114 of a duration corresponding approximately to 400 yards range. The output of the generator 28 is connected to the other one of the deflecting plates 17 in such a way that the energy of the notch is added to the energy from the receiver 16 so that an echo pulse appears in the notch in the image on the oscilloscope screen in the manner shown in Fig. 6 with respect to one echo signal. The complete representation is shown in Fig. 7—F.

Energy from the expansion notch generator 24 is amplified in the intensifier circuit 29 and applied as a negative pulse to the cathode 30 of the oscilloscope 18 to increase the intensity of the beam for the duration of each pulse from the generator 24.

Reference will now be made to Fig. 2 which shows suitable circuit diagrams for the elements 19, 26 and 29 of the arrangement of Fig. 1. The circuit of Fig. 2 comprises a sweep circuit, an unblanking circuit, and an intensifier circuit.

The sweep circuit proper consists essentially of a diode 44 which passes negative pulses only, a single pulse multivibrator comprising the tubes V1 and V2 and called the "basic sweep timer" for triggering the sweep from the 10 to 30 volt negative pulses supplied from the rotary spark gap 12 in the transmitter, a sweep valve tube V3 by means of which the sweep condenser 31 is charged, a discharging tube V4 through which the condenser 31 is discharged at one substantially constant rate for the entire discharge portion of the sweep cycle except for the period during which it is desired to expand the time scale when it is discharged at a faster, and preferably constant, rate, a sweep voltage divider 32 and 33, and an inverter tube V5. Individual power supplies can be provided for each of the tubes but for simplicity in the drawing the anodes of many of the tubes have been shown connected through respective anode resistors to the positive terminal of a 450-volt direct current source 34, the negative terminal of which is connected to ground, and the anodes of others of the tubes have been shown connected through respective anode resistors to the positive terminal of a 300-volt direct current source 35 whose negative terminal is grounded.

Negative 10 to 30-volt pulses of about 1.2 microseconds duration are supplied to the terminals 40 and 41 of the sweep circuit. A conventional coupling condenser 42 and a leak resistor 43 are provided in the input circuit of the tube V1 along with the diode 44 which is connected in the grid lead of the tube V1 so that negative pulses only are passed. Eight of these pulses which are substantially concurrent with the "transmitted pulses" are shown in Fig. 3—A. The tubes V1 and V2 comprise a single pulse multivibrator which produces relatively square negative pulses at least 600 microseconds long, the duration of the longest sweep. As there are, for example, 480 pulses per second from the spark gap 12, there are intervals of more than 2,000 microseconds between transmitted pulses and the inactive periods are over 1400 microseconds long. These negative sweep timing pulses produced by the "basic sweep timer" (see Fig. 3—C) are applied to the grid of the tube V3.

Considering now the "basic sweep timer" in somewhat greater detail, the anode of the tube V1 is connected through a coupling condenser 45 to the grid of the tube V2 while the anode of the tube V2 is connected through a coupling condenser 46 to the grid of the tube V1. A leak resistor 47 is connected between the grid of the tube V1 and ground, and a leak resistor 48 is similarly connected between the grid of the tube V2 and ground. Plate voltage for the anode of the tube V1 is supplied from the source 34 through the resistors 49 and 50, the common terminal of these two resistors being connected to ground through a condenser 51. Anode voltage for the tube V2 is provided by the source 34 through resistors 52 and 50. The cathode of tube V1 is connected to ground while the cathode of tube V2 is connected to ground through resistor 53. The cathode of the tube V2 is connected to the positive terminal of the source 34 through resistors 54 and 50. A diode 55 is connected between the grid of the tube V2 and ground for stabilization purposes.

The action of the multivibrator circuit for generating substantially square negative pulses of the type shown in Fig. 3—C for basic sweep timing is as follows: Statically when no pulses are being received from the transmitter, the tube V1 is passing current while the tube V2 is biased to cut-off. Therefore, the voltage at the plate of V2 is the full voltage of the source 34 (approximately 450 volts), while that of the plate of the tube V1 is less by the drop through the resistors 49 and 50. Furthermore, condensers 45 and 46 which couple the plates and grids of the tubes V1 and V2 are charged to the voltages of their respective plates, condenser 46 being charged at a higher potential. The negative synchronizing pulses applied between the terminals 40 and 41 from the transmitter serve only to trip the circuit, that is start the action of the multivibrator. When one of these pulses is applied to the grid of the tube V1, it tends to drive this tube to cut-off causing a decrease in current through resistor 49 and a resultant rise in voltage in the plate of the tube V1. As this voltage rises condenser 45 charges to a higher potential causing the grid of the tube V2 to become more positive and the tube V2 to begin to conduct. Thus the current through the resistor 52 causes a drop in voltage at the plate of the tube V2 and sends a negative impulse through the condenser 46 causing the grid of the tube V1 to become more negative, further cutting off this tube. The above action, once started by an incoming negative synchronizing pulse (such as one of the pulses 100 shown in Fig. 3—A or pulses having a fixed phase relationship with respect thereto), is very rapid and continues until tube V1 is cut off and tube V2 is passing current. The tubes will remain in this condition until the grid of tube V1 is sufficiently recovered from the negative pulse through the condenser 46 to permit tube V1 to become conducting again. This depends on the time required for the condenser 46 to discharge through the resistor 47. The values of resistance and capacitance are so chosen that the tube V1 will remain cut off for approximately 600 microseconds. The tubes then restore very rapidly to their initial condition. The output of the basic sweep timer at the plate of the tube V2 is a substantially square negative pulse due to the rapid drop and rise of voltage at this plate. Eight of these pulses 102 are shown in Fig. 3—C. This is the pulse needed to cut off the sweep valve tube V3. In the action just described, the condenser 45 has attained a charge above its initial static condition when the voltage at the plate of the tube V1 rose and it must be discharged before initial conditions can again be realized. Also it is desirable to discharge this capacitor quickly which can not be done through the grid leak 48. The diode 55 is used to provide a low impedance discharge path to ground for this condenser and the multivibrator circuit is thus restored very rapidly to its initial condition before another incoming negative pulse is applied.

The circuit constants of the sweep circuit shown on the drawing are such that the maximum sweep time is about 600 microseconds corresponding to a range of about 100,000 yards. The sweep expansion resistor 56 in the cathode of the discharge tube V4 permits adjustment of the maximum sweep from approximately 44,000 yards to 100,000 yards.

In the absence of a sweep timing pulse 102 from the basic sweep timer, the sweep valve tube V3 is normally passing current to charge the sweep condenser 31 through a circuit which includes ground, the sweep condenser 31, the cathode-anode path of the tube V3, resistor 57, and the direct current source 34. When one of the basic sweep timing pulses 102 is applied to the grid of the tube V3 through the coupling condenser 54A, the current charging the sweep condenser 31 is interrupted and the condenser discharges through the discharge tube V4 at a constant rate (in the absence of a pulse from the notch expansion generator 24). The rate of discharge is determined by the characteristics of the tube V4 and the value of the resistance 56 which is shunted by the condenser 58. The output of the generator 24 is applied to an amplifier and phase inverter (shown by the box 36), the output of which is applied through coupling condenser 59 to the grid of the tube V4, a leak resistor 60 being connected between the grid of this tube and ground.

The pulses applied to the amplifier 36 are, as shown in Fig. 7—E, negative 1½ volt square pulses of 7.2 microseconds duration corresponding to a wave travel of 1200 yards, and these are amplified and phase inverted by the element 36 to become square wave positive pulses which are fed to the grid of the tube V4 and also to the grid of the tube V7 in the intensifier circuit which will be described below. The positive pulses applied to the grid of the tube V4 cause this tube to pass a greater current for the duration of the 1200 yard notch, or in other words for a short time on either side of the 400 yard pulse produced by the notch generator 28 and which is, as shown in Fig. 5, centered in the 1200 yard notch pulse 115. The faster discharge of the sweep condenser 31 increases the sweep speed and therefore expands the sweep during the occurrence of the 7.2 microsecond pulse 115. Fig. 3—D shows direct sweep pulses 103 produced across the sweep condenser 31 in the absence of notch expansion pulses 115 at the tube V4, while Fig. 3—E shows sweep pulses 104 produced under these conditions in the output of the amplifier inverter tube V5. Fig. 3—G shows the timing of the notch pulses and notch expansion pulses with respect to the transmitted signal pulses shown in Fig. 3—A while the same relation is shown, on a larger scale, in Figs. 7—D and 7—E. It will be noted that each notch pulse 114 lags its corresponding transmitted pulse 110. This lag is also shown in Fig. 6, which is a combination of Figs. 4 and 5, and wherein pulse 110 is the transmitted signal pulse after reception and detection and pulse 111 is the echo pulse bracketed by the 400 yard notch pulse 114. Fig. 4 shows the pulses 110 and 111 alone while Fig. 5 shows the pulse 14 with respect to the time position of the pulse 110. The 400 yard notch pulse 114, as pointed out above and as shown in Fig. 7, is started 400 yards after the pulse 112 produced by the range unit 23. The expansion notch generator 24 produces a pulse 115 which starts with the pulse produced by the range unit 23 and extends over a period corresponding to a range of 1200 yards, or, in other words, it starts 400 yards before the starting time of the pulse 114 produced by the notch generator 28 and extends for a time interval corresponding to a 400 yard range after the notch pulse 114 has been completed. Thus the sweep wave is said to be "expanded" during the occurrence of the pulse from the expansion notch generator 24. This period of "notch expansion" is shown by the portions 107 in the pulses 106 in Fig. 3—H. Referring again to Fig. 6 it is noted that the direct pulse 110 appears narrower than the echo pulse 111. This is because there is no expansion during the reception of the direct signal, hence it appears narrower than the echo.

The wave shown in Fig. 3—H is applied through condenser 61 to one of the deflecting plates 22 in the cathode ray tube 18. A voltage 180 degrees removed from the voltage wave shown in Fig. 3—H is applied to the other of the deflecting plates 22 by means of the condenser 62 which is connected to the plate of the amplifier-inverter tube V5. The grid of the tube V5 is connected by means of the resistor 63 to the common terminal of the condensers 32 and 33. To drive the inverter V5, about a tenth of the total sweep voltage across the condenser 31 is taken from the voltage divider formed by the condensers 33 and 32. The amplification in the tube V5 produces an output approximately equal to the direct sweep voltage applied to one of the plates 22 by means of the condenser 61. Bias for the tube V5 is provided by means of a resistor 64 while the grid leak resistor 65 is connected in the circuit between the grid of the tube V5 and ground. The diode 66 is connected across the condenser 32 in such manner that positive current is conducted to ground. Under static conditions this prevents the condenser 32 from maintaining any positive potential above ground when charge is received through the sweep valve V3 and the condenser 33. Under dynamic conditions when the sweep condenser 31 is discharging, condenser 33 also discharges drawing its discharge current through the condenser 32 since the diode 66 will not conduct current in this direction. A negative pulse is thereby impressed on the grid of the amplifier-inverter V5 producing the required positive pulse in its output. The effect of the diode 66 under dynamic conditions is therefore to stabilize the initial potential impressed on the input of the inverter V5 at the beginning of each sweep, this initial potential being limited to approximately that of ground. Without the diode 66, variations in the time interval between successive signals from the fixed average would cause some fluctuations in the horizontal deflecting force, thereby some fuzziness of the image since images of successive signals would not exactly coincide on the screen. The function of the inverter V5 is to reverse the phase of the voltage 103 and produce inverted sweep pulses 104 so that the effects produced by the two horizontal deflecting plates 22 on the beam are additive, that is, when one plate attracts the beam, the other repels it.

The longest sweep impulse lasts about 600 microseconds so that at the rate of 480 per second, the inactive intervals between sweep impulses are 1400 microseconds or more. If the electron beam struck the screen continuously a bright spot would be produced at the start of the sweep and the return of the beam would be visible across the screen. To eliminate these undesirable features, the beam in the cathode ray tube 18 is normally blanked off by fixing the static or continuous biasing voltage of the grid 37 therein at a sufficiently negative value to cut the beam off and positive pulses sufficient to "release" the beam are applied to the grid only during the interval when sweep impulses are applied to the horizontal deflecting plates 22. The biasing voltage is applied to the grid 37 from tap 74 of the potentiometer 70 connected across a suitable constant source of power (not shown). The cathode 30 is connected to a tap 71 thereon through a resistance 72 and one of the focussing anodes 38 is connected by means of the tap 73 to a point on the potentiometer 70 which is positive with respect to the potential of the cathode 30. The control element 37 of the cathode ray tube is connected to the tap 74 on the potentiometer 70 (which is negative with respect to potential of the cathode 30) through the resistor 75. The second anode 39 of the cathode ray tube is connected to a tap 76 on potentiometer 77 which is connected to a second power supply (not shown). This is done to provide means for placing the second anode at the average potential of the plates 17 which are direct connected to the receiver output tube. The tap 76 is at a positive potential with respect to the potential of the tap 73 on the potentiometer 70. The values of the potentials applied to the members 30, 37, 38 and 39 are chosen, in accordance with well-known practice, so as to produce a fine spot on the screen 78.

The circuit arrangement for generating the unblanking pulses comprises the tube V6 and associated circuit connections. The square negative pulses from the output of the "basic sweep timer" V1—V2 are applied through coupling condenser 80 to the control grid of the tube V6. The grid leak resistor 81 is provided between the control grid and ground, the cathode being connected directly to ground. The anode of the tube V6 is connected through resistor 82 to the positive terminal of the source 35 and through coupling condenser 83 to the control element 37 of the cathode ray tube 18.

The sharply-peaked negative voltage across the resistor 81 in series with the coupling condenser 80 is applied to the control grid of the tube V6, driving this tube to cut-off by the time each negative pulse 102 shown in Fig. 3—C has reached but a small fraction of its ultimate value. Thus the output voltage at the plate of the tube V6 rises sharply due to the decreased voltage drop through its plate resistor 82. The voltage of the plate remains at this increased positive value until tube V6 again becomes conducting when the input pulse repasses the cut-off voltage. This rise and fall of the voltage of the plate of the tube V6 sends a positive pulse through the coupling capacitor 83 to the control element 37 releasing the cathode ray tube beam. These unblanking pulses are shown as the pulses 105 in Fig. 3—F. The time that the grid of the tube V6 is held below the cut-off voltage determines the duration of the unblanking pulse. As mentioned above this time is about 600 microseconds.

Due to the fact that the beam is swept at a faster rate across the screen during the time of expansion, the image on the screen during that period of time is not as bright as for the rest of the image. To compensate for this an intensifier circuit comprising the tube V7 and its associated circuit connections has been provided. Positive pulses corresponding in time duration to the 1200 yard negative pulse 115 produced by the expansion notch generator 24 are applied to the grid of the tube V7 through the coupling condenser 90 and resistor 91. A grid leak resistor 92 is connected between the common terminal of the members 90 and 91 and ground and the cathode of the tube V7 is connected to ground through the biasing resistor 93. The anode is connected through the anode resistor 94 to the positive terminal of the source 35. The action of the tube V7 is to amplify each positive pulse applied to its grid to produce a negative pulse which is applied to the cathode 39 of the cathode ray tube 18 through coupling condenser 95. This causes the cathode of the tube 18 to swing in a negative direction to intensify the beam during the period of time spanned by the pulse produced by the expansion notch generator 24. This period is represented between the points A and B in Fig. 5 and in Fig. 7—F.

It will be apparent that by making use of the circuit arrangement described above, the linear time scale is expanded between the points A and B of Fig. 5 and of Fig. 7—F and the positions of these points with respect to the transmitted pulse 110 can be varied by varying the time of generation of the pulse in the range unit 23. Thus if the range unit pulse 112 is generated after a shorter time interval following the corresponding pulse 110, the period of expanded sweep shown in Fig. 5 and Fig. 7—F moves to the left as does also the 400 yard notch pulse 114 which is always centered within the period of the expanded sweep. The pulse 114 is centered with respect to the selected echo 111 either by manual means or by any suitable automatic means.

Circuit constants of an arrangement in accordance with the invention which has been actually constructed and satisfactorily operated have been indicated on the drawings. It is to be understood, however, that the invention is not limited to the use of elements having these particular circuit constants as it is obvious that changing the frequency of pulsing, the length of the pulse produced by the expansion notch generator or varying the length of the sweep timing pulses are examples of various changes which might be made and which will cause changes in the circuit constants.

Although the present invention has been described in terms of the preferred illustrative embodiment, it will be realized that the invention and its several features are susceptible of embodiment in a wide variety of other forms and hence the invention is to be understood as comprehending such other forms as may fairly come within the spirit and letter of the appended claims.

Application Serial No. 583,537 filed March 19, 1945, which is a division of the present application, is directed to apparatus disclosed herein involving a cathode ray tube sweep circuit arrangement with ray intensity control. Another divisional application Serial No. 583,536, filed March 19, 1945, is directed to the object locator system disclosed herein.

What is claimed is:

1. In combination, a condenser, means for cyclically varying the charge on said condenser in one direction and means for cyclically varying the charge on said condenser in the opposite direction, said last-mentioned means comprising a circuit including a device for controlling the impedance of said circuit to vary the rate of condenser charge variation, and means to cause the impedance of said device to change for a short period and then return to its original value during each period of the condenser charge variation produced by said second-mentioned means.

2. In combination, a condenser, means for cyclically varying the charge on said condenser in one direction and means for cyclically varying the charge on said condenser in the opposite direction, said last-mentioned means comprising a circuit including a space current device comprising an anode, a cathode and a control element for controlling the impedance of said circuit to vary the rate of condenser charge variation, and means for cyclically applying a pulse to said control element to vary the impedance of said circuit for the duration of said pulse, the frequency of application of said pulse being not less than the rate of repetition of said cycles of condenser charge variation.

3. The combination of elements as in claim 2 in which said pulse is flat-topped.

4. The combination of elements as in claim 2 in which said pulse has a time span which is small compared with that of a complete cycle of condenser charge variation.

5. In combination, a condenser, means for cyclically varying the charge on said condenser in one direction and means for cyclically varying the charge on said condenser in the opposite direction, said last-mentioned means comprising a circuit including a space current device comprising an anode, a cathode and a control element for controlling the impedance of said circuit to vary the rate of condenser charge variation, and means for cyclically applying a pulse to said control element to vary the impedance of said circuit for the duration of said pulse, there being at least one pulse for each complete cycle of condenser charge variation and the pulses being substantially equally spaced flat-top pulses of equal time duration.

6. A circuit for expanding any desired restricted portion of the sweep or time scale of a cathode ray tube to produce magnification in the direction of the sweep of the corresponding portion of the image on the screen of the tube, comprising a condenser, means for cyclically varying the charge on said condenser in one direction and means for cyclically varying the charge on said condenser in the opposite direction, said last-mentioned means including a circuit including a device for controlling the impedance of said circuit to vary the rate of condenser charge variations, and means to cause the impedance of said device to change for a short period and then return to its original value during each period of the condenser charge variation produced by said second-mentioned means, the charge variations across said condenser being utilized to produce the sweep or time scale of said tube.

PAUL A. JEANNE.

REFERENCES CITED

The following references are of record in the file of this patent:

UNITED STATES PATENTS

| Number | Name | Date |
| --- | --- | --- |
| 2,189,549 | Hershberger | Feb. 6, 1940 |
| 1,924,174 | Wolf | Aug. 29, 1933 |
| 2,313,967 | Read | Mar. 16, 1943 |
| 2,244,013 | Knoop | June 3, 1941 |
| 2,244,513 | Burton | June 3, 1941 |